United States Patent [19]

Nguyen

[11] Patent Number: 5,459,484
[45] Date of Patent: Oct. 17, 1995

[54] DISPLAY CONTROL SYSTEM AND METHOD OF USING SAME

[75] Inventor: Hung Nguyen, Poway, Calif.

[73] Assignee: Proxima Corporation, San Diego, Calif.

[21] Appl. No.: 237,013

[22] Filed: Apr. 29, 1994

[51] Int. Cl.⁶ ..................................................... G09G 1/06
[52] U.S. Cl. .......................................... 345/129; 345/127
[58] Field of Search ...................................... 345/132, 127, 345/129, 131, 138, 148; 348/448, 445, 556; 382/47, 56

[56] References Cited

U.S. PATENT DOCUMENTS

| | | | |
|---|---|---|---|
| 4,373,194 | 2/1983 | Demke et al. | 345/129 |
| 4,412,252 | 10/1983 | Moore et al. | 345/129 |
| 4,555,191 | 11/1985 | Gojo | 345/129 |
| 4,598,283 | 7/1986 | Tung et al. | 345/129 |
| 4,821,031 | 4/1989 | Roberts | 345/127 |
| 5,265,176 | 11/1993 | Miller | 345/127 |

*Primary Examiner*—Richard A. Hjerpe
*Assistant Examiner*—Vivian Chang
*Attorney, Agent, or Firm*—Bernard L. Kleinke; Jerry R. Potts

[57] ABSTRACT

A new and improved display control system includes a set of low speed analog to digital converters for converting incoming, high resolution information such as workstation based information into digital information for display on a low resolution display monitor. A logic arrangement compresses the high resolution information by eliminating certain horizontal and vertical pixel image information during one frame cycle and by eliminating certain adjacent horizontal and vertical pixel image information during the next frame cycle.

21 Claims, 5 Drawing Sheets

DISPLAY CONTROL SYSTEM AND METHOD OF USING SAME

TECHNICAL FIELD

The present invention relates in general to a display control system and method of controlling the display of information images. The invention more particularly relates to a display control system and method of controlling a display to enable the visualization of a virtual 1,280×1024 workstation image on a low resolution 1024×768 personal computer liquid crystal display panel monitor.

BACKGROUND ART

There have been many different types and kinds of display control systems for enabling the visualization of a high resolution image such as a workstation image on a low resolution monitor. In this regard, such systems typically require expensive, buffer memory units to store the workstation image information in mapped digital data for display on the low resolution monitor.

While such display control systems have been satisfactory for some applications, it would be highly desirable to have a new and improved display control system which is capable of enabling a high resolution image such as a 1,280×1024 workstation image to be displayed on a low resolution monitor such as a 1024×768 personal computer liquid crystal display monitor. Such a display control system should enable a workstation-based information to be shared with a large group of users in a relative inexpensive manner.

Another problem with prior art display control systems has been the need to employ high speed flash type analog to digital converters to convert the incoming workstation-based information at a sufficiently fast rate to enable compression of the information for display on a low resolution display monitor.

While the utilization of such high speed analog to digital converters has been satisfactory for some applications, such devices are very expensive. Therefore, it would be highly desirable to have a new and improved display control system that converts incoming workstation-based information at a sufficient rate to enable compression of the information on the fly without the need of utilizing expensive buffer memory units or high speed flash-type analog to digital converters.

DISCLOSURE OF INVENTION

Therefore, the principal object of the present invention is to provide a new and improved display control system and method of using it to enable a high resolution image to be displayed on a low resolution display monitor.

Another object of the present invention is to provide such a new and improved display control system and method of using it to enable workstation-based information to be shared with a large group of users in a relative inexpensive manner.

Still yet another object of the present invention is to provide such a new and improved display control system and method of constructing it so that it converts incoming workstation-based information at a sufficient rate to enable compression of the information on the fly without the need of utilizing expensive buffer memory units or high speed flash-type analog to digital converters.

Briefly, the above and further objects of the present invention are realized by providing a new and improved display control system which can enable high resolution information such as workstation-based information to be shared with a large group of users in a relative inexpensive manner according to a novel method of using and constructing the system.

The display control system includes a set of low speed relatively inexpensive analog to digital converters for converting incoming high resolution information into digital information for display on a low resolution display monitor. The system converts and displays one half of the incoming information during one frame cycle and then converts and displays the other half of the incoming information during the next frame cycle.

The display control system also includes a logic arrangement that compresses the high resolution information by eliminating certain horizontal and vertical pixel image information during one frame cycle and by eliminating certain adjacent horizontal and vertical pixel image information during the next frame cycle. In this manner, the whole high resolution image is displayed every two frame cycles and is perceived by a user as a virtual high resolution image without flicker or stripping.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
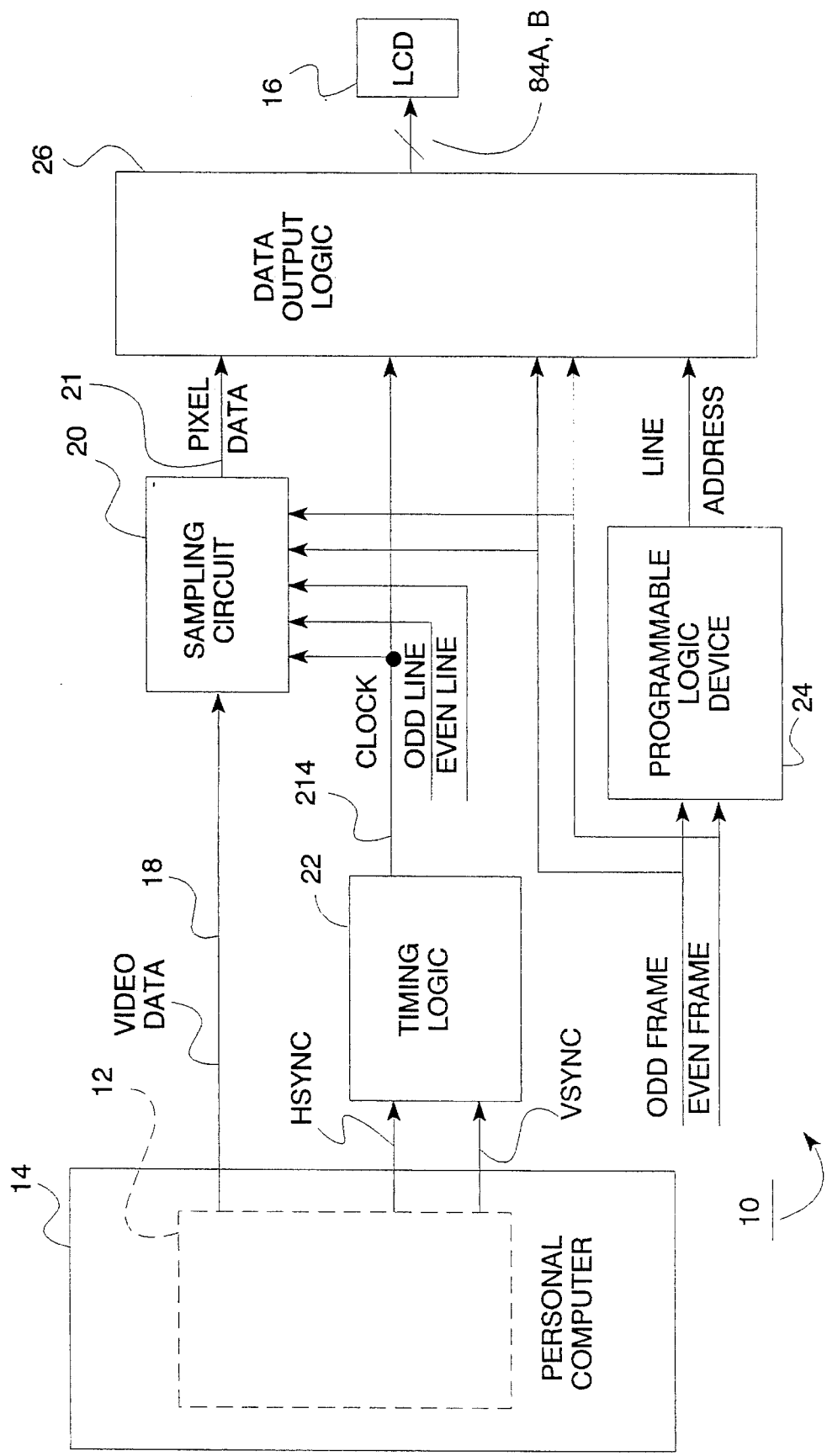
FIG. 1 is a block diagram of a display control system which is constructed in accordance with the present invention.

Referring now to the drawings, and more particularly to FIG. 1 thereof, there is shown a display control system 10 which is constructed in accordance with the present invention. The display control system 10 is adapted to be coupled between a video signal producing device, such as a video output module 12 of a personal computer 14 and a display device, such as a liquid crystal display unit 16. The liquid crystal display unit 16 includes a liquid crystal panel (not shown) for displaying a compressed image defined by a matrix array of pixel images arranged in n number of rows and m number of columns. In this regard, the number n is about 1024 and the number m is about 768.

The display control system 10 generally includes a low speed sampling circuit 20 that converts an incoming analog RGB video data signal 18, developed by the output module 12, into a pixel data signal 21 for helping a compressed image to be displayed by the liquid crystal display unit 16 in a cost effective manner. In this regard, as will be explained hereinafter, the sampling circuit 20 includes a low cost, low speed, analog to digital converter arrangement that has a sampling rate which is substantially slower than the incoming rate of the video data signal which is typically between about 15 MHz and about 135 MHz.

A timing circuit 22 develops various timing signals that enable the sampling circuit 20 to receive and convert the incoming video data signal into pixel data 21 that is indicative of a workstation image or image to be compressed defined by a matrix array of pixel images arrayed in N number of rows and M number of columns. In this regard, the number N is about 1280 and the number M is about 1024. As the sampling rate of the sampling circuit 20 is substantially slower than the incoming data rate of the video data signal 18, it should be understood by those skilled in the art that during any given frame time period, only one-half of the pixel image information for any frame cycle is converted into pixel data. Thus, the whole workstation image is converted into pixel data once every two frame cycle periods.

The display control system 10 also includes a programmable logic device or state machine 24 which is responsive to the timing circuit 22 for generating addressing or compression signals to help compress the whole workstation image on the fly into a compressed image that is displayed by the liquid crystal display unit 16. The state machine 24 is driven by frame signals indicative of ODD frame time periods and EVEN frame time periods. One such state machine 24 was constructed using GAL logic. The actual program design of the GAL logic is shown in Appendix A.

The system 10 also includes a data output circuit 26 responsive to the timing logic circuit 22 and the programmable logic device 24 for causing only certain portions of the pixel data 21 to be gated to the liquid crystal display panel 16 each frame.

In operation, the sampling circuit 20 converts the incoming video data signal 18 based upon whether a given frame cycle is an odd frame time period or cycle or an even frame time period or cycle and whether the video data signal being sampled is indicative of an odd pixel image in the M by N pixel image array or an even pixel image in the M by N pixel image array. More particularly, the sampling circuit 20 converts the video data signal indicative of odd pixel images on odd lines in the M by N matrix array and even pixel images on even lines for every even frame time period. Alternately, for every odd frame time period, the sampling circuit 20 converts the video data signal indicative of even pixel images on odd lines in the M by N matrix array and odd pixel images on even lines. In this manner, every analog pixel image signal embodied within the workstation-based image is converted into pixel data once every two frame time periods.

From the foregoing, it should be understood by those skilled in the art, that causing the whole workstation image to be converted once every two frame time periods results in a substantially flicker free image being displayed by the liquid crystal display unit 16.

The compression technique of the programmable logic device 24 also alternates between odd frame time periods and even frame time periods. In this regard, the device 24 causes designated pairs of pixel image columns and designated pairs of pixel images within each rows to be averaged over every two frame cycle periods to produce a series of averaged or single pixel image columns and a series of averaged pixel image pairs. The averaged pixel image columns are indicative of a single pixel image column. The averaged pixel image pairs are indicative of a single pixel image.

The above described compression technique does not involve composite pixel arrangements, nor expensive buffer memory devices. Instead, conversion of the incoming video data signal 18 into a compressed image is accomplished on the fly in a relatively inexpensive manner with simple buffer logic and low speed analog to digital converters.

Figure 3:
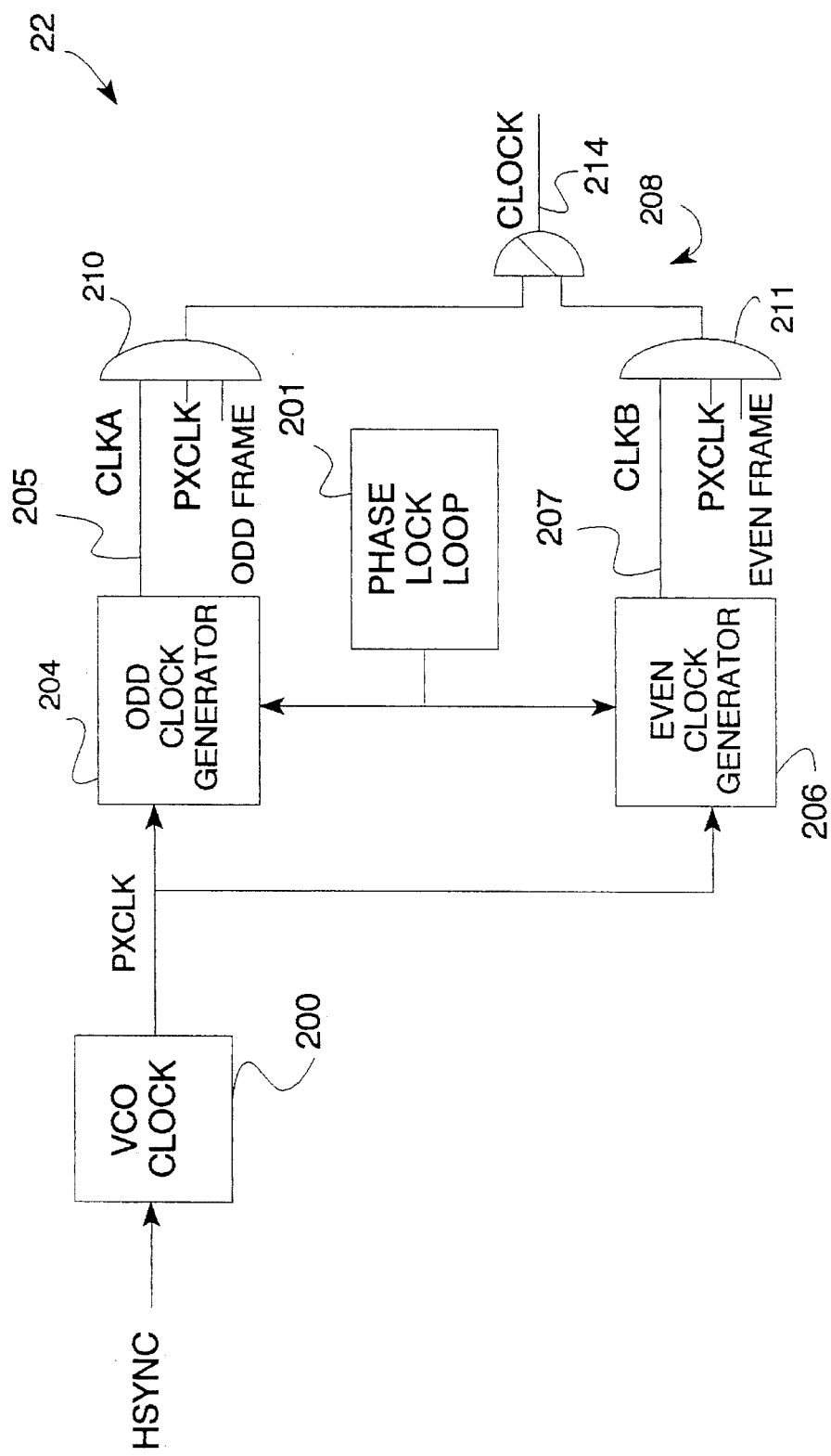
FIG. 3 is a timing control circuit of the display control system of FIG. 1.

Considering now the sampling circuit 20 in greater detail with reference to FIG. 3, the sampling circuit 20 includes a set of analog to digital converter arrangement 31 for converting the incoming analog red, green and blue video module signals into digital signals. A sample clock signal 34 generated by a logic gating arrangement 36, enables the incoming analog signals to be converted at a predefined rate that allows only odd pixel image data to be converted during odd line, odd frame time periods and odd line, even frame time periods and only even pixel image data to be converted during even line, odd frame time periods and odd line, even frame time periods. In this manner, the image to be compressed, is sampled or converted on the fly at a rate that is substantially slower than the incoming data rate.

As will be explained herein in greater detail, during each odd frame time period, one half of the image to be compressed is converted and during each even frame time period, another half of the image to be compressed is converted. In this manner, conversion of the image is averaged over the entire image.

Figure 6:
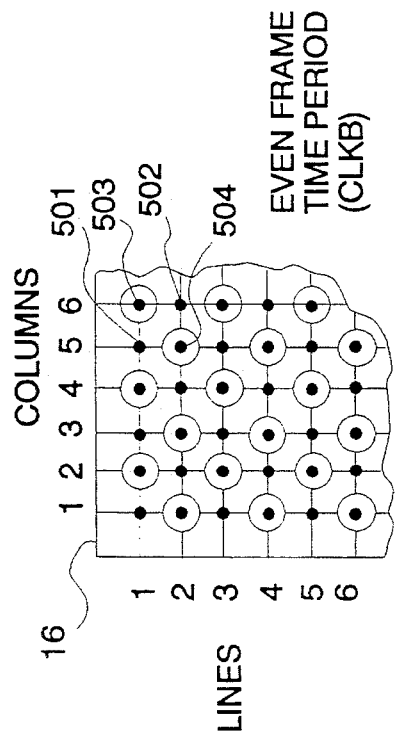
FIGS. 5 and 6 are fragmentary diagrammatic views of the liquid crystal display panel of FIG. 1, illustrating eliminated workstation based information.
Figure 5:
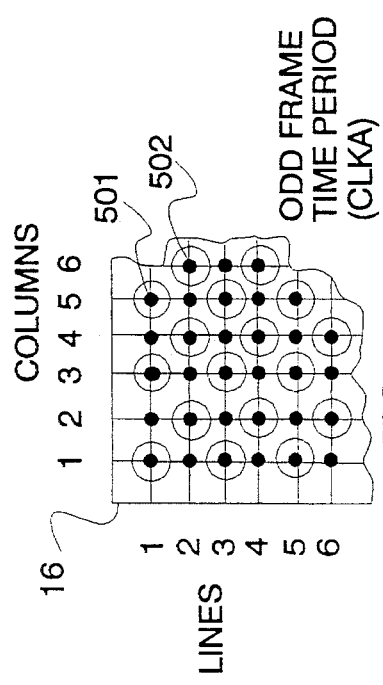

Referring now to FIGS. 5 and 6, the conversion of the M by N matrix image data is illustrated diagrammatically in greater detail. In FIG. 5, each circled pixel image element, such as an element 501 and an element 502 is indicative of a converted incoming analog signal during an odd frame time period. Thus, in odd lines such as lines 1, 3, 5, . . . 1023, odd pixel image data has been converted and in even lines, such as lines 2, 4, 6, . . . 1024 even pixel image data has been converted.

FIG. 6 illustrates the conversion of the M by N matrix image data diagrammatically. In this regard, each circled pixel image element such as an element 503 and an element 504 is indicative of the converted incoming analog signals during an even frame time period. More particularly, as best seen in FIG. 6, during odd lines, even pixel image data has been converted and during even lines, odd pixel image data has been converted.

Because of the slow response time of the liquid crystal panel 16, the image formed by the panel 16 during the odd frame time period is combined with the image formed by the panel 16 during the even frame time period to be perceived by a viewer as a whole image in a substantially flicker free manner.

Considering now the gating arrangement 36 in greater detail, the gating arrangement 36 generally includes a set of logic gates 101–105 which implements the function of determining which pixel data is to be sampled or converted. In this regard, depending on the odd/even frame cycle, and whether image data is to be displayed on an odd/even line, a clock signal 110 will be passed by one of the gates 101–104 to a logic OR gate 105 to cause the sample clock signal 34 to be generated.

Figure 2:
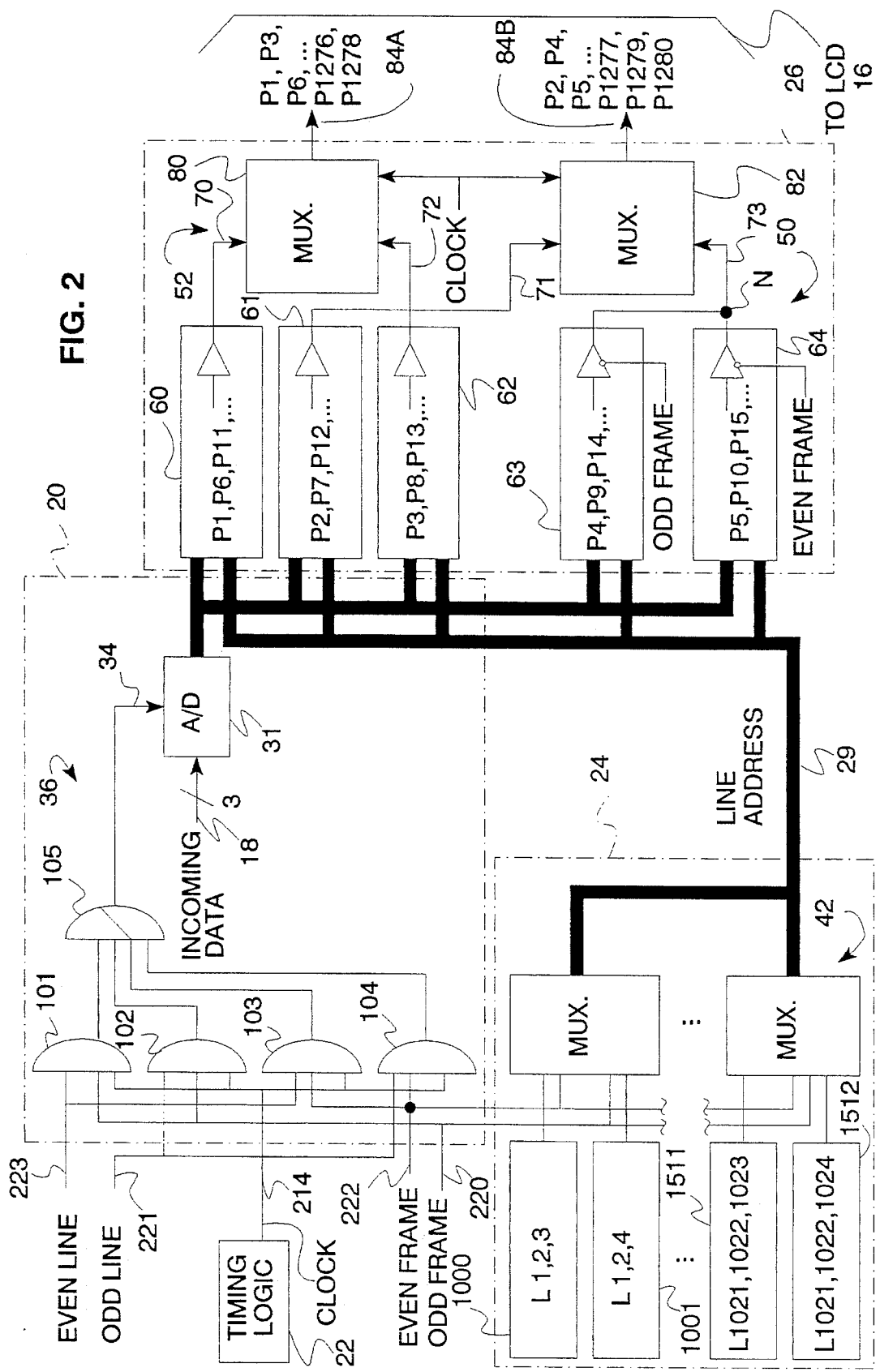
FIG. 2 is a schematic diagram of the display control system of FIG. 1.

Considering now the programmable logic device 24 in greater detail with reference to FIG. 2, the device 24 generally includes a group of logic circuits 1000–1512 and a multiplexor arrangement 42 for generating a line address or compression signal for causing the vertical portion of the image to be compressed from N lines to n lines. In a preferred form of the invention, the logic circuits 1000–1512 are embodied in gate array logic, and are shown in Appendix A. The preferred language is ALTERA's Advanced Hardware Descriptive Language (AHDL).

The logic circuits 1000–1512 are arranged to cause certain lines or rows of pixel image data in the workstation-based image to be eliminated every odd frame cycle. During every even frame cycle, certain other lines or rows of pixel image data are eliminated. The two sets of eliminated lines or rows are thus averaged together to cause the number of lines to be compressed from N lines to n lines. As will be explained hereinafter, since the liquid crystal display panel 16 has a slow response time, the compressed image is indicative of and perceived by the viewer as the entire workstation image as each line in the workstation image is in fact displayed once every two frame cycles.

Figure 8:
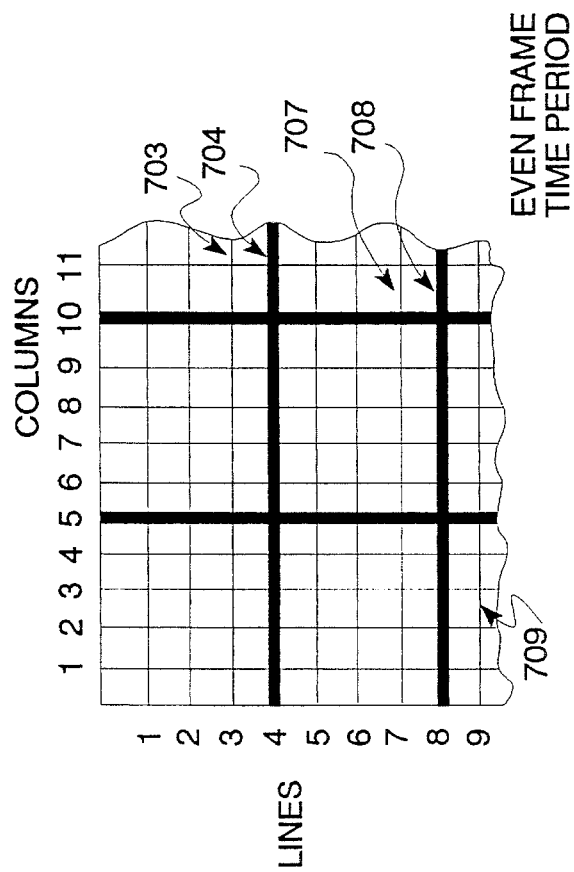
FIGS. 7 and 8 are fragmentary diagrammatic views of the liquid crystal display panel of FIG. 1 illustrating representations activated pixel elements during two consecutive frame cycles.
Figure 7:
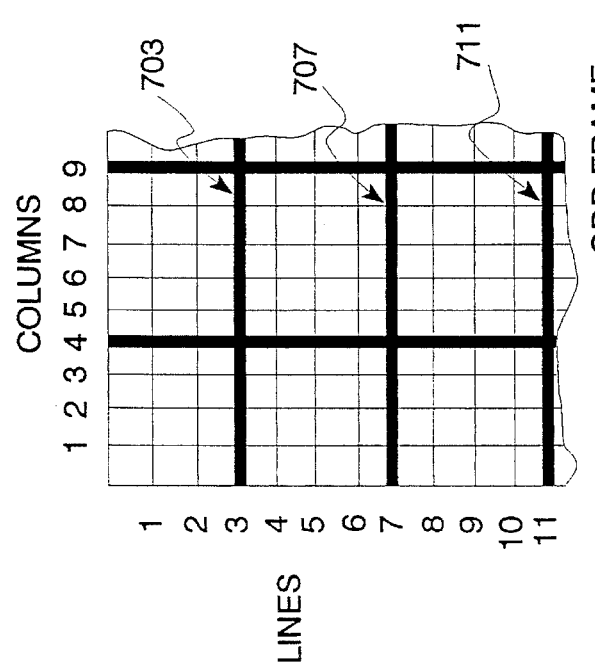

Referring now to FIGS. 7 and 8, the averaging of lines of pixel image data is illustrated diagrammatically in greater detail. In FIG. 7, during an odd frame time cycle, every third out of four rows or lines of pixel image data is eliminated such as a row 703, 707 and 711. Thus, lines 3, 7, 11, etc. are eliminated. In FIG. 8, during the even frame cycle, every fourth out of four rows or lines of pixel image data is eliminated such as a row 704 and 708. Thus, lines 4, 8, 12 etc. are eliminated. As the eliminated third and fourth line groups, such as line 3 and line 4 are adjacent to one another, the viewer perceives the resulting image as a combination of both the eliminated lines. Because the entire workstation-based image is actually displayed every two frame cycles, the resulting image is displayed without introducing any substantial stripping.

In order to enable adjacent lines of pixel images to be averaged, the multiplexor arrangement 42 generally includes a plurality of groups of line address pair circuits. In this regard for example, the odd frame time logic for gating lines 1, 2, 3 is multiplexed with the even frame time logic for gating lines 1, 2, 4 to permit lines 3 and 4 to be averaged.

From the foregoing, it will be understood by those skilled in the art that the multiplexor arrangement 42 includes a plurality of line address drivers (not shown) which are coupled to data output logic 26 by an address buss line 29.

Considering now the data output logic 26 in greater detail with reference to FIG. 2, the data output logic 26 generally includes a set 50 of frame buffer devices coupled to the address buss line 29 and a set 52 of multiplexors for assembling output data in odd and even byte pairs. The set 50 of frame buffer devices are responsive to pixel data converted by the sampling circuit 20 as well as the line address signals generated by the programmable logic device 24. In this regard, the set 50 of frame buffer devices enables certain adjacent columns of pixel image data to be averaged together over every two frame cycles to form sets of single pixel image columns.

Considering now the set 50 of frame buffer devices in greater detail, the set 50 of devices generally includes a group of logic circuits 60–64 for generating compression signals 70–73 for causing the horizontal portion of the image to be compressed from M lines to m lines. The logic circuits 60–64 are embedded in the previously mentioned GAL and are shown in Appendix A.

The logic circuits 60–64 are arranged to cause certain columns of pixel image data in the workstation image to be eliminated during every odd frame cycle and certain other columns of pixel image data to be eliminated during every even frame cycle. The two sets of eliminated columns are thus averaged together, to cause the number of columns to be compressed from M columns to m columns.

Referring now to FIGS. 7 and 8, the averaging of columns of pixel image data is illustrated in greater detail. In FIG. 7, during an odd frame time cycle, every four out of five columns of pixel image data is eliminated. Thus, columns 4, 9, 14 etc. are eliminated. In FIG. 8, during the even frame time cycle, every fifth out of five columns of pixel image data is eliminated. Thus, columns 5, 10, 15 etc. are eliminated. As the eliminated column groups, such as columns 4 and 5 in the first group and columns 9 and 10 in the second group are adjacent to one another, the viewer perceives the resulting image as a combination of both columns (4 and 5) and (9 and 10) for example. Because the entire workstation image is displayed every two frame cycles, the resulting image is displayed flicker free and without introducing any substantial stripping.

Considering now the set 52 of multiplexors, the set 52 generally includes a pair of devices for sending odd and even pixel data information to the liquid crystal display unit 16. In this regard, the set 52 of multiplexor devices includes an odd multiplexor device 80 and an even multiplexor device 82. The odd multiplexor device 80 is coupled to the output of the logic circuits 60 and 62. The even multiplexor device 82 is coupled to the output of the logic circuits 63 and 64.

Considering now the logic circuits 60–64 in greater detail with reference to FIG. 5, the logic circuits 60–64 control compression for the columns indicated in Table I.

TABLE I

| Logic Circuit Character Reference | Columns Controlled by Logic Circuit |
| --- | --- |
| P1 (60) | 1, 6, 11, 16, 21, . . . , 2044 |
| P2 (61) | 2, 7, 12, 17, 22, . . . , 2045 |
| P3 (62) | 3, 8, 13, 18, 23, . . . , 2046 |
| P4 (63) | 4, 9, 14, 19, 24, . . . , 2047 |
| P5 (64) | 5, 10, 15, 20, 25, . . . , 2048 |

From Table I, it will be understood by those skilled in the art that column pixel image data controlled by logic circuits 63 and 64 will be compressed.

As best seen in FIG. 5, in order to control column compression the output drivers of logic circuits 63 and 64 are enabled by a pair of logic signals, an ODD FRAME signal 220 and an EVEN FRAME signal 222. Logic signal 220 and 222 are generated by the timing logic circuit 22 and are indicative of an ODD frame time period and an EVEN frame time period respectively. The logic circuits for generating the ODD FRAME signal 220 and the EVEN FRAME signal 222 are conventional flip flops (not shown) and will not be described herein.

When the ODD logic signal 220 is a logical high, column driver 64 is disabled and column driver 63 is enabled. Similarly, when the EVEN logic signal 222 is a logical high, column driver 63 is disabled and column driver 64 is enabled.

The output signals from drivers 63 and 64 are connected together at a common node N and are coupled to the multiplexor 82.

Figure 4:
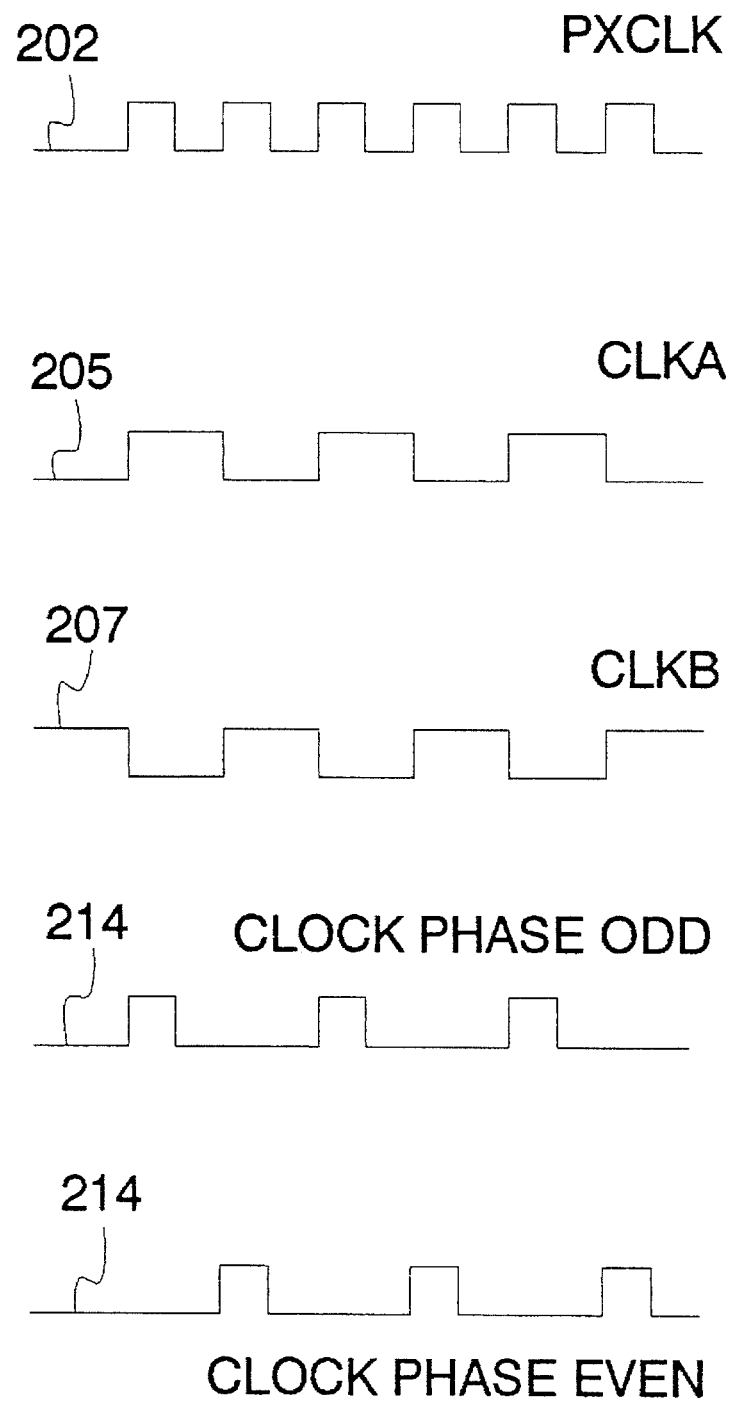
FIG. 4 is a timing diagram of the clock signals generated by the timing control circuit of FIG. 3.

Considering now the timing circuit 22 in greater detail, the timing circuit 22 generally includes a phase VCO or pixel clock generator 200 for generating a reference or pixel clock signal 202 and a pair of unsynchronized clock generators, such as an odd clock generator 204 and an even clock generator 206 for generating a CLKA signal 205 and CLKB signal 207 respectively. A phase lock loop 201 causes the signals 205 and 207 to be synchronized relative to one another as best seen in FIG. 4.

A logic arrangement 208 consisting of a set of logic gates 210–212 coupled to the clock generators 204 and 206 develop an output CLOCK signal 214. The clock signal 214 is phase shifted once each frame cycle to enable odd pixel data to be sampled during one frame cycle period and even pixel data to be sampled during the next frame cycle period.

The timing circuit also includes a group of logic elements (not shown) that generate an ODD line signal 221 and an EVEN line signal 223. Those skilled in the art would be able to arrange logic elements to determine whether a given line was an odd line or an even line without undue experimentation.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A display system, comprising:

data input means responsive to an incoming video signal indicative of an image to be compressed, said image to be compressed being defined by a matrix array of pixel images arranged in N number of rows and M number of columns, for generating on the fly odd frame time pixel image information signals indicative of a matrix array of odd frame time period pixel images arranged in N number of rows and M number of columns defining one-half of said image to be compressed and for generating on the fly even frame time pixel image information signals indicative of a matrix array of even frame time period pixel images arranged in N number of rows and M number of columns defining another half of said image to be compressed;

row gating means responsive to said odd frame time signals for generating odd frame row compression signals indicative of odd frame time period pixel images arranged in an odd frame time series of rows defining less than one-half of the rows facilitate forming a compressed image and responsive to said even frame time signals for generating even frame row compression signals indicative of even frame time period pixel images arranged in an even frame time series of rows defining less than another half of the rows in said compressed image to enable said odd frame time series of rows and said even frame time series of rows to be displayed alternately during respective odd frame time periods and even frame time periods so they can be averaged together and perceived as a compressed n number of rows, where n is substantially less than N;

column gating means responsive to said odd frame time signals for generating odd frame time column compression signals indicative of odd frame time period pixel images arranged in an odd frame time series of columns defining less than one-half of the columns in said compressed image and responsive to said even frame time signals for generating even frame time column compression signals indicative of even frame time period pixel images arranged in an even frame time series of columns defining less than another half of the columns in said compressed image to enable said odd frame time series of columns and said even frame time series of columns to be displayed alternately during respective odd frame time period and even frame time periods so they can be averaged together and perceived as a compressed m number of columns, where m is substantially less than M; and data output means responsive to said row compression signals and to said column compression signals for causing said odd frame time series of rows and columns and said even frame time series of rows and columns to be displayed during their respective odd frame time period and even frame time periods so they are averaged and perceived as said compressed image said compressed image being defined by a matrix array of pixel images arranged in n number of rows and m number of columns.

2. A display system according to claim 1, further comprising:

frame time means for generating a series of alternating frame time signals indicative of odd frame time periods and even frame time periods.

3. A display system according to claim 2, wherein said data input means includes row control means for eliminating the pixel image information indicative of even pixel images in every other row during the odd frame time periods and for eliminating the pixel image information indicative of even pixel images in every other row during the even frame time periods.

4. A display system according to claim 2, wherein said data input means includes row control means for eliminating the pixel image information indicative of odd pixel images in every other row during the odd frame time periods and for eliminating the pixel image information indicative of odd pixel images in every other row during the even frame time periods.

5. A display system according to claim 2, wherein said column gating means includes column control means for eliminating the pixel image information indicative of pixel images in every X number of columns during even frame time periods and for eliminating the pixel image information indicative of pixel images in every X−1 number of columns during odd frame time periods.

6. A display system according to claim 2, wherein said column gating means includes column control means for eliminating the pixel image information indicative of pixel images in every X number of columns during odd frame time periods and for eliminating the pixel image information indicative of pixel images in every X+1 number of columns during even frame time periods.

7. A method of controlling a display system, comprising:

responding to an incoming video signal indicative of an image to be compressed, said image to be compressed being defined by a matrix array of pixel images arranged in N number of rows and M number of columns;

generating on the fly odd frame time pixel image information signals indicative of a matrix array of odd frame time period pixel images arranged in N number of rows and M number of columns defining one-half of said image to be compressed;

generating on the fly even frame time pixel image information signals indicative of a matrix array of even frame time period pixel images arranged in N number of rows and M number of columns defining another half of said image to be compressed;

generating odd frame row compression signals indicative of odd frame time period pixel images arranged in an odd frame time series of rows defining less than one-half of the rows to facilitate forming a compressed image to n number of rows, where n is substantially less than N;

generating even frame row compression signals indicative of even frame time period pixel images arranged in an even frame time series of rows defining less than another half of the rows in said compressed image to enable said odd frame time series of rows and said even frame time series of rows to be displayed alternately during respective odd frame time periods and even frame time periods so they can be averaged together and perceived as a compressed n number of rows, where n is substantially less than N;

generating odd frame column compression signals indicative of odd frame time period pixel images arranged in an odd frame time series of columns defining less than one-half of the columns in said compressed image;

generating even frame time column compression signals indicative of even frame time period pixel images arranged in an even frame time series of columns defining less than another half of the columns in said compressed image to enable said odd frame time series of columns and said even frame time series of columns to be displayed alternately during respective odd frame time periods and even frame time periods so they can be averaged together and perceived as a compressed m number of columns, where m is substantially less than M; and responding to said row compression signals and to said column compression signals for causing said odd frame time series of rows and columns and said even frame time series of rows and columns to be displayed during their respective odd frame time period and even frame time periods so they are arranged and perceived as said compressed image, said compressed image defined by a matrix array of pixel images arranged in n number of rows and m number of columns.

8. A method of compressing an image to be displayed during alternating odd frame time intervals and even frame time intervals, said image being defined by a two dimensional matrix array of pixels arranged in columns and rows, comprising:

eliminating selected ones of the pixels forming the image to be displayed in at least one dimension of the matrix array during the odd frame time intervals;

displaying all the other pixels during odd frame time intervals;

eliminating selected other ones of the pixels forming the image in said at least one dimension of the matrix array during the even frame time intervals; and displaying all other pixels during even frame time intervals including the pixels eliminated during the odd frame time intervals;

whereby the pixels eliminated during the odd frame time intervals are displayed during the even frame time intervals and the pixels eliminated during the even frame time intervals are displayed during the odd frame time intervals to compress the image in said at least one dimension of the matrix array;

wherein the step of eliminating during the odd frame time intervals includes eliminating at least one column of pixels out of all the columns of pixels in the image to be displayed during the odd frame time intervals; and wherein the step of eliminating during the even frame time intervals includes eliminating at least one column of pixels out of all the columns of pixels in the image to be displayed during the even frame time intervals;

wherein the step of eliminating during the odd frame time intervals further includes eliminating at least one row of pixels out of all the rows of pixels in the image to be displayed during the odd frame time intervals; and wherein the step of eliminating during the even frame time intervals further includes eliminating at least one row of pixels out of all the rows of pixels in the image to be displayed during the even frame time intervals.

9. A method of compressing an image according to claim 8, wherein the column of pixels eliminated during the odd and even frame time intervals are adjacent columns in the matrix array.

10. A method of compressing an image according to claim 8, wherein the rows of pixels eliminated during the odd and even frame time intervals are adjacent rows in the matrix array.

11. A method of compressing an image to be displayed during alternating odd frame time intervals and even frame time intervals, said image being defined by a two dimensional matrix array of pixels arranged in columns and rows, comprising:

eliminating selected ones of the pixels forming the image to be displayed in at least one dimension of the matrix array during the odd frame time intervals;

displaying all the other pixels during odd frame time intervals;

eliminating selected other ones of the pixels forming the image in said at least one dimension of the matrix array during the even frame time intervals; and displaying all other pixels during even frame time intervals including the pixels eliminated during the odd frame time intervals;

whereby the pixels eliminated during the odd frame time intervals are displayed during the even frame time intervals and the pixels eliminated during the even frame time intervals are displayed during the odd frame time intervals to compress the image in said at least one dimension of the matrix array;

wherein the step of eliminating during the odd frame time intervals includes eliminating pixels in another dimension of the matrix array during the odd frame time intervals; and wherein the step of eliminating during the even frame time intervals includes eliminating pixels in said another dimension of the matrix array during the even frame time intervals.

12. A method of compressing an image according to claim 11, wherein the pixels eliminated during the odd frame time and even frame time intervals in the first mentioned dimension are arranged in columns adjacent to one another; and wherein the pixels eliminated during the odd frame time and even frame time intervals in the second mentioned dimension are arranged in rows adjacent to one another.

13. A method of compressing an image according to claim 11, further comprising:

generating on the fly odd frame time pixel image information signals indicative of a matrix array of odd frame time period pixel images arranged in N number of rows and M number of columns defining one-half of said image to be displayed; and generating on the fly even frame time pixel image information signals indicative of a matrix array of even frame time period pixel images arranged in N number of rows and M number of columns defining another half of said image to be displayed.

14. A method of compressing an image according to claim 13, wherein said step of eliminating includes:

generating odd frame row compression signals indicative of odd frame time period pixel images arranged in an odd frame time series of rows defining less than one-half of the rows to facilitate forming a compressed image;

generating even frame row compression signals indicative of even frame time period pixel images arranged in an even frame time series of rows defining less than another half of the rows in said compressed image;

generating odd frame time column compression signals indicative of odd frame time period pixel images arranged in an odd frame time series of columns defining less than one-half of the columns in said compressed image;

generating even frame time column compression signals indicative of even frame time period pixel images arranged in an even frame time series of columns defining less than another half of the columns in said compressed image; and wherein said step of displaying includes displaying alternately said odd frame time series of rows and said even frame time series of rows during respective odd frame time periods and even frame time periods to average them together so they are perceived as a compressed n number of rows, where n is substantially less than N; and displaying alternately said odd frame time series of columns and said even frame time series of columns during respective odd frame time period and even frame time periods to average them together so they are perceived as a compressed m number of columns, where m is substantially less than M.

15. A display system for compressing an image to be displayed during alternating odd frame time intervals and even frame time intervals, said image being defined by a two dimensional matrix array of pixels arranged in columns and rows, comprising:

means for eliminating selected ones of the pixels forming the image to be displayed in at least one dimension of the matrix array during the odd frame time intervals;

means for eliminating selected other ones of the pixels forming the image to be displayed in said at least one dimension of the matrix array during the even frame time intervals; and means for displaying during the odd frame time intervals all the pixel eliminated during the even frame time intervals and for displaying during the even frame time intervals all the pixels eliminated during the odd frame time intervals; whereby the eliminated pixels to compress the image to be displayed in at least one dimension of the matrix array;

wherein the means for eliminating during the odd frame time intervals includes means for eliminating at least one column of pixels out of all the columns of pixels in the image to be displayed during the odd frame time intervals; and wherein the means for eliminating during the even frame time intervals includes means for eliminating at least one column of pixels out of all the columns of pixels in the image to be displayed during the even frame time intervals;

wherein the means for eliminating during the odd frame time intervals further includes means for eliminating at least one row of pixels out of all the rows of pixels in the image to be displayed during the odd frame time interval; and wherein the means for eliminating during the even frame time intervals includes means for eliminating at least one row of pixels out of all the rows of pixels in the image to be displayed during the even frame time interval.

16. A display system according to claim 15, wherein the columns of pixels eliminated during the odd and even frame time intervals are adjacent columns in the matrix array.

17. A display system according to claim 15, wherein the rows of pixels eliminated during the odd and even frame time intervals are adjacent rows in the matrix array.

18. A display system for compressing an image to be displayed during alternating odd frame time intervals and even frame time intervals, said image being defined by a two dimensional matrix array of pixels arranged in columns and rows, comprising:

means for eliminating selected ones of the pixels forming the image to be displayed in at least one dimension of the matrix array during the odd frame time intervals;

means for eliminating selected other ones of the pixels forming the image to be displayed in said at least one dimension of the matrix array during the even frame time intervals; and means for displaying during the odd frame time intervals all the pixel eliminated during the even frame time intervals and for displaying during the even frame time intervals all the pixels eliminated during the odd frame time intervals; whereby the eliminated pixels to compress the image to be displayed in at least one dimension of the matrix array;

wherein the means for eliminating during the odd frame time intervals includes means for eliminating pixels in another dimension of the matrix array during the odd frame time intervals; and wherein the means for eliminating during the even frame time intervals includes means for eliminating pixels in said another dimension of the matrix array during the even frame time intervals.

19. A display system according to claim 18, wherein the pixels eliminated during the odd frame time and even frame time intervals in the first mentioned dimension are arranged in columns adjacent to one another; and wherein the pixels eliminated during the odd frame time and even frame time intervals in the second mentioned dimension are arranged in rows adjacent to one another.

20. A display system according to claim 18, further comprising:

means for generating on the fly odd frame time pixel image information signals indicative of a matrix array of odd frame time period pixel images arranged in N number of rows and M number of columns defining one-half of said image to be displayed; and means for generating on the fly even frame time pixel image information signals indicative of a matrix array of even frame time period pixel images arranged in N number of rows and M number of columns defining another half of said image to be displayed.

21. A display system according to claim 20, wherein said means for eliminating includes:

means responsive to said odd frame time signals for generating odd frame row compression signals indicative of odd frame time period pixel images arranged in an odd frame time series of rows defining less than one-half of the rows in a compressed image;

means responsive to said even frame time signals for generating even frame row compression signals indicative of even frame time period pixel images arranged in an even frame time series of rows defining less than another half of the rows in said compressed image;

means responsive to said odd frame time signals for generating odd frame time column compression signals indicative of odd frame time period pixel images arranged in an odd frame time series of columns defining less than one-half of the columns in said compressed image;

means responsive to said even frame time signals for generating even frame time column compression signals indicative of even frame time period pixel images arranged in an even frame time series of columns defining less than another half of the columns in said compressed image; and wherein said means for displaying includes means for displaying alternately said odd frame time series of rows and said even frame time series of rows during respective odd frame time periods and even frame time periods to average them together so they are perceived as a compressed n number of rows, where n is substantially less than N; and means for displaying alternately said odd frame time series of columns and said even frame time series of columns during respective odd frame time period and even frame time periods to average them together so they are perceived as a compressed m number of columns, where m is substantially less than M.

* * * * *

UNITED STATES PATENT AND TRADEMARK OFFICE
CERTIFICATE OF CORRECTION

PATENT NO. : 5,459,484
DATED : October 17, 1995
INVENTOR(S) : Hung Nguyen

It is certified that error appears in the above-indentified patent and that said Letters Patent is hereby corrected as shown below:

Column 7, line 44, after "rows", insert --to--.

Signed and Sealed this

Tenth Day of June, 1997

Attest:

BRUCE LEHMAN

Attesting Officer

Commissioner of Patents and Trademarks